Dec. 8, 1942.  R. ABELL  2,304,066
FEEDING APPARATUS FOR MAINTAINING A CONSTANT LEVEL OF LIQUID
Filed Oct. 19, 1939  2 Sheets-Sheet 1
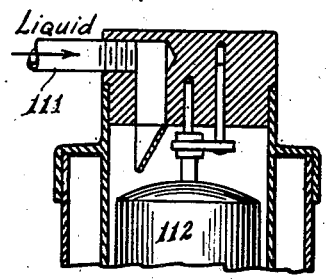
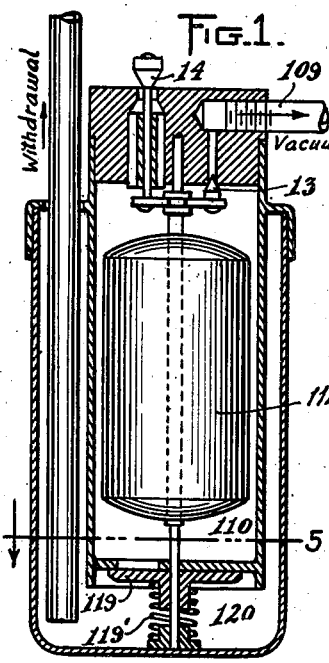
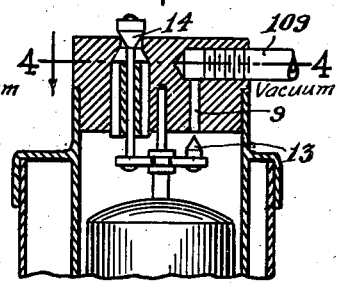
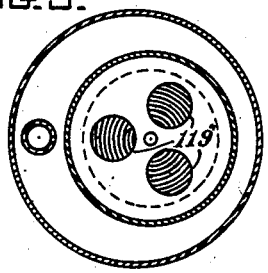
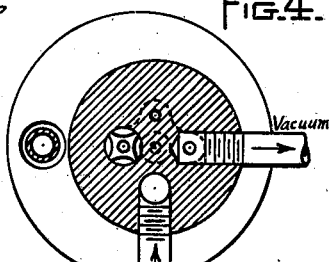
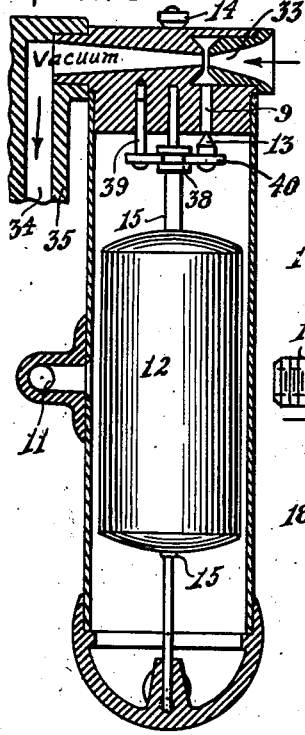
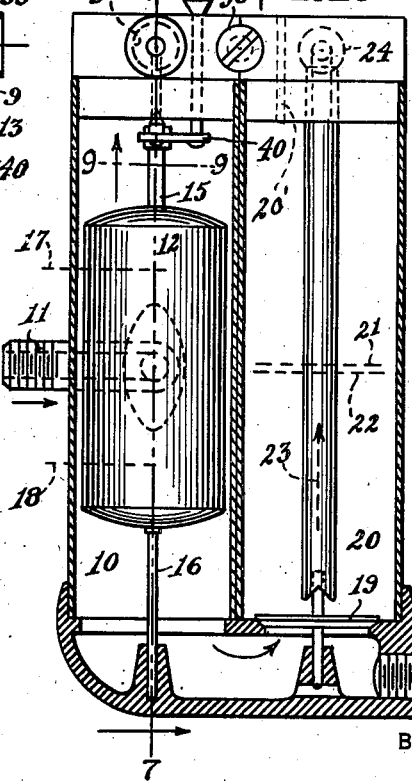
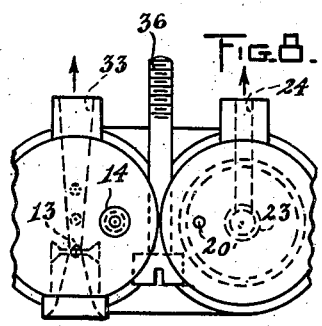
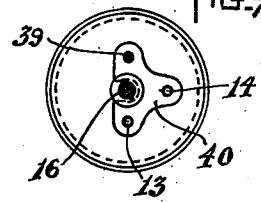
INVENTOR
ROLLIN ABELL.
BY
Everett Kent
ATTORNEY.

Dec. 8, 1942.                R. ABELL                 2,304,066
FEEDING APPARATUS FOR MAINTAINING A CONSTANT LEVEL OF LIQUID
              Filed Oct. 19, 1939          2 Sheets-Sheet 2
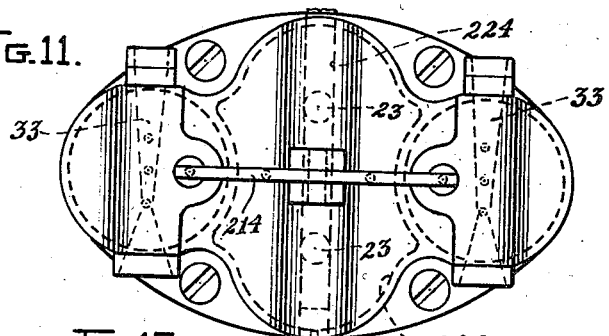
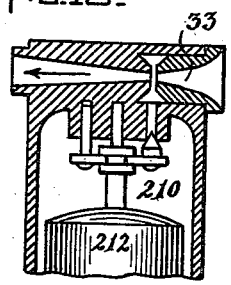
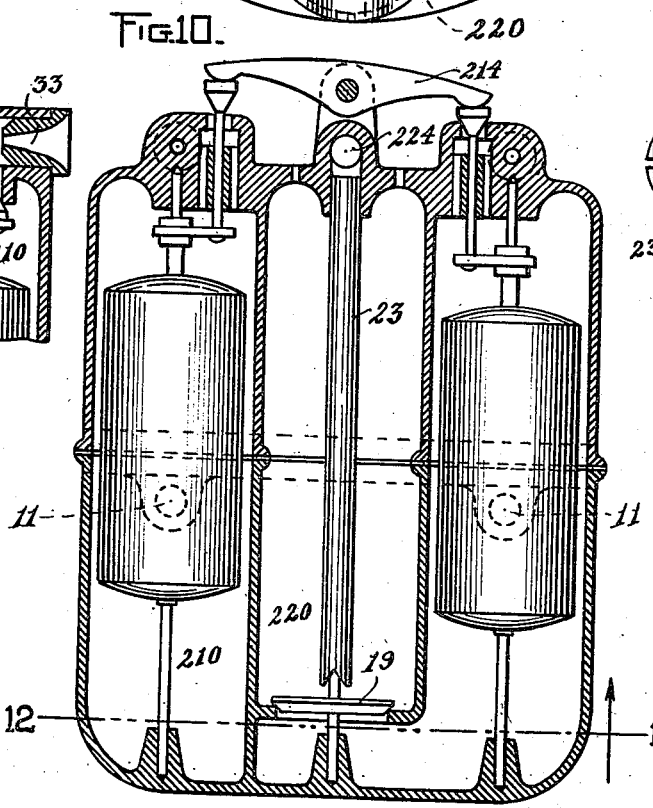
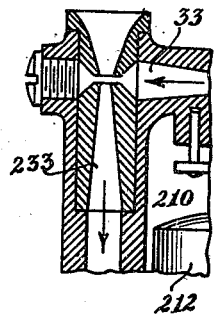
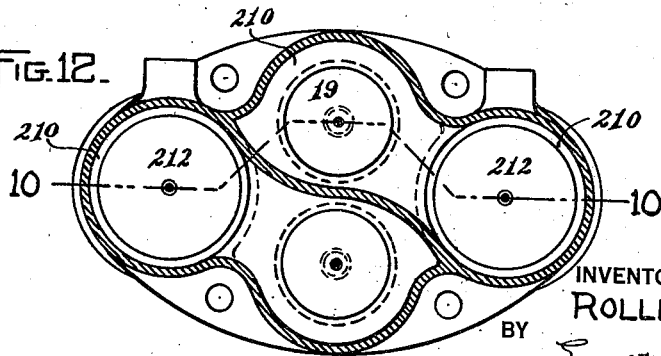
INVENTOR
ROLLIN ABELL
BY
Everett Kent
ATTORNEY Patented Dec. 8, 1942

2,304,066

UNITED STATES PATENT OFFICE 2,304,0666

FEEDING APPARATUS FOR MAINTAINING A CONSTANT LEVEL OF LIQUID

Rollin Abell, Fort Lauderdale, Fla.

Application October 19, 1939, Serial No. 300,204

20 Claims. (Cl. 103—236)

This invention relates to improvements in feeding apparatus for maintaining a constant level of liquid.

More especially this invention relates to vacuum operated pumps for raising a liquid from a low main supply reservoir to a high local supply container open to atmosphere for local service of the liquid to other apparatus of any sort. The object is to maintain the level of liquid approximately constant, in the high container, relative to that container, irrespective of variation in the rate at which liquid is drawn thence.

As applied to a carburetor, this device replaces the usual fuel pump and float feed mechanism. It is more direct, reliable and uniform; is less complicated; has about one-third the number of parts of the present approved system; and has propportionately low cost.

Advantages of this device, believed to be novel over vacuum tanks and mechanical pumps as heretofore used in the automobile industry to maintain a fixed fuel level for the carburetor, include the following:

First: It is attached directly to the carburetor; and so a single fuel pipe and connections serve the purpose, in contrast to the two pipes and connections formerly required.

Second: It requires no mechanism on the engine; and it has no connections to any other unit. It can be operated by the carburetor. It can be integral with the carburetor. It takes the place of the usual float bowl mechanism, and results in a complete self-feeding carburetor.

Third: Its vacuum and fuel delivery impulses are so frequent that the fuel level is maintained constant, without significant variation.

Fourth: The compound or series vacuum booster permits of its use to supply plain tube carburetors, notwithstanding that in such the vacuum is very low, at moderate speeds with the throttle open.

Fifth: It uses inertia and friction of fuel on its float to make the action of the valves be positive; supplanting the springs, levers, and snap mechanism for valve action in former vacuum tanks. Specifically, it produces in its float chamber a wide range of liquid surge, outspeeding and out distancing the float.

Sixth: Its use of a ratio of areas, by which the area of the surging body of liquid in the float chamber is very small relative to the area of fuel in the atmospheric local supply chamber makes a wide range of hydrostatic head in the float chamber, which correspond to only a trifling fluctuation in the "constant level" in the local supply. Specifically, the area and body of its float nearly fill the area and body of the float chamber, throughout the vertical range of the top of the surging liquid in the float chamber; and the ratio minimizes the change of fuel level which occurs in the atmospheric chamber consequent on the delivery attending a deep surging fall of the level in the float chamber.

Seventh: Its locating of the fuel inlet to the float chamber at the level which is desired constant for fuel in the atmospheric chamber conduces to frequency of pulsations, even at low engine speed; and to the maintaining of an approximately unchanging level in the atmospheric chamber; and to the retaining of that level after the engine is stopped.

Eighth: It makes the dumping valve from float chamber to local supply very large, relative to the size of intake pipe of float chamber, so that the discharge of fuel from the float chamber, when it occurs, will go preferentially freely and quickly, to the atmospheric local supply chamber, rather than flow back into the intake pipe. This is especially important at periods of large demand from the local supply by the carburetor.

Ninth: Its pump construction, comprising a float which slides a tube up and down a stationary wire guide, the top of the tube having a swivelled plate carrying vacuum and vent valves of impact type set to have very short travel, and there being a guide for the plate to align the valves.

Tenth: Its provision of a vacuum booster in the head of its vacuum float chamber.

Eleventh: Its provision of double capacity flow, by dual pump chambers feeding a single atmospheric chamber. The pump valves may be connected together for uniform timing. Their complementary action gives a fuel delivery at every half stroke.

Twelfth: Its provision to compound or increase the vacuum, for low vacuum carburetors, and especially for dual action to feed a single atmospheric chamber, by providing a plurality of pump chambers with separate parallel vacuum boosters, and a larger vacuum booster connected in series with the parallel separate boosters.

Thirteenth: Its attaining rapidity of pulsations with augmented capacity. Specifically it stores kinetic energy in inflowing liquid, at each cycle, and utilizes that for indraft of more liquid, by inertia of the moving column, after a quick closing of the suction valve.

Fourteenth: Its construction by which liquid is raced up and down in the pump chamber, through a range of levels greatly out-distancing the float in the same body of liquid, whereby force is applied to that float, for operating the valves, of a higher order than would correspond to change of buoyancy of a float on a body of liquid whose level is currently being steady. Specifically, at the top of each up-surge the float presses the vacuum valve closed, with buoyancy produced by an augmented hydrostatic head; and at the bottom of each down-surge it presses the air valve closed, with a portion of its weight augmented over what its pressure would be if the float had floated down as far as the liquid has receded.

Other features of novelty will be found in the apparatus herein described for showing an embodiment of the invention. This, it should be understood, is illustrative only, and not definitive in the sense of limiting the invention to the particular construction shown. Nor is the invention limited to the particular field of utility to which it is here shown applied, for it can be used for the maintaining of any body of liquid at constant level, by replenishment from a supply at lower level.

In this respect it will be observed that the invention accomplishes its purpose of maintaining the liquid level without there being any float at that level which is to be corrected and maintained.

When applied for the feeding of a carburetor, the vacuum power to operate it for the feeding is conveniently obtained from the carburetor and herein the device is so illustrated; but the requisite vacuum may be had from any other available source, or if desired from mechanism specifically arranged for the purpose, independent of that which consumes the local supply.

This application for patent is a continuation in part of my pending applications, Serial Nos. 212,568 and 248,072, entitled respectively "Fuel feeding apparatus for internal combustion engines," and "Carburetors."

It is intended that the patent shall cover, by suitable expression in the appended claims, whatever features of patentable novelty exist in the invention herein disclosed.

In the accompanying drawings:

Figure 1 is an elevation, in medial section, of liquid feeding apparatus embodying features of the invention, showing the air valve open and the vacuum valve closed;

Figure 2 is a similar view of the upper portion of the apparatus of Figure 1, but showing the air valve closed and the vacuum valve open;

Figure 3 is a view similar to Figure 2 but in section on a medial plane at right angles to that of Figure 2;

Figure 4 is a plan, in section on 4—4 of Figure 2, looking in the direction of the arrow;

Figure 5 is a plan, in section on 5—5 of Figure 1, looking in the direction of the arrow;

Figure 6 is an elevation, mostly in medial section, of a modified form of liquid feeding apparatus embodying features of the invention;

Figure 7 is an elevation, in section on 7—7 of Figure 6 but with the air valve closed and the vacuum valve open;

Figure 8 is a top plan of the apparatus of Figure 6;

Figure 9 is a plan, in section on 9—9 of Figure 6, looking upward at the head, with the container walls removed;

Figure 10 is an elevation in medial section through an embodiment of the invention in which an arrangement somewhat like that of Figure 6 is further developed into a double acting mechanism, the section being medial with respect to adjacent elements, as shown by line 10—10 in Figures 12;

Figure 11 is a plan of the same;

Figure 12 is a plan of the same in section on the line 12—12, looking upward;

Figure 13 is an elevation of the top portion of the vacuum chambers of Figures 10 and 11, in medial section through the vacuum booster located in the head thereof;

Figure 14 is a fragmentary elevation of a similar vacuum chamber in which the booster in the head is compounded with another vacuum booster.

The drawings filed in the Patent Office herewith, as distinguished from reproductions of them on smaller or larger scale, express the dimensions of apparatus which I have found sufficient in size and have used successfully, with carburetors of the types shown in my above-mentioned co-pending applications for patent, when substituted in a standard Ford eight cylinder eighty-five horse power sedan automobile and tested at car speeds varying from zero to the highest practicable, under varying road and load conditions. However, in Figures 1–4 the positions of the vacuum valve 13 and its connections are rotated 90 degrees about the vertical axis, for convenience of showing both air and vacuum valves in a single figure, this change being an immaterial one made only for convenience.

The element 10 is variously herein referred to by whichever of its functions fits the context, the same being a "float chamber" with valve connections which make it sometimes a "vacuum chamber" in its general function of being a "pump chamber." The chamber 20 to which chamber 10 delivers is distinguished by being called the "atmospheric chamber," or, when the reference is to its utility, called the "local supply chamber." It has a vent 20'.

Figure 6 shows an arrangement of chambers which is good for both capacity and compactness for serving the type of automobile mentioned, in that the pump chamber 10 stands outside of and beside the local supply chamber 20.

The pump chamber contains float 12, preferably cylindrical, which nearly fills the cross sectional area of the chamber, so that only a small space is left for liquid between the float and the chamber walls; and the float has a body dimension tall enough to extend beyond the range of surge of liquid. Fast to the float axially is a tube 15 which is strung loosely on a wire 16 fixed on the vertical axis of the chamber; and this tube carries a grooved collar 38, in whose groove is swivelled loosely, as by a yoke-notch, a small horizontal plate 40, which carries rigidly the stems of vacuum valve 13, atmospheric valve 14, and the stiff upstanding guide pin 39 set eccentric to the axis; the ducts which these valves close, and the hole for guiding this pin, being all in the otherwise-closed head of the chamber 10. The plate being loosely swivelled, and the valve being conical plugs, the pin 39 positions the plate so that each valve 13, 14 will enter and close perfectly the end of its duct, with abrupt impact, without friction. The vacuum valve seats outward into the inner end of the vacuum duct 9; the air valve seats inward into the outer end of the air duct; and their stems are preferably so short that the total travel of the float is no more than enough to set each valve wide open. In the instance illustrated, this is a travel of about one-sixteenth of an inch, and further travel up or down is blocked by one or the other closed valve. This travel of the float is neither commensurate in distance nor co-terminous in time with the rise and fall of liquid in the float chamber. In the instance which is being illustrated the liquid is observed to rise to a region indicated by the line 17, or higher, and to fall in the supply duct 11 to a region indicated by the line 18, or lower, in each pulsation cycle; and this range of surge is at least an inch and a half.

The float may be made and set so that when all is at rest with liquid at the level of pipe 11 the float rests in the liquid with vacuum valve 13 open. Then whenever the engine starts the carburetor will draw through 13 to raise liquid from the main reservoir.

When in regular operation the action, during each cycle, is that after the liquid has reached its low point of the cycle, the vacuum pull on liquid is felt with accelerating effect for a considerable distance, beginning at the low point and while the float is still suspended on the air valve 14, the liquid level being not high enough to sustain it. During this half of the up-surge the liquid is accumulating speed; and after the liquid has reached its median height the vacuum valve continues open for a while with further indraft and rapid rise of liquid, before the buoyancy generated by the rise of liquid has overcome the inertia of the float sufficiently to lift the float through the short distance necessary to close the vacuum valve. And after that valve is closed, momentum of the up-surge, which is at high speed through the small flowage area between the float 12 and the wall of chamber 10, combined with the momentum of the column of liquid flowing up from the main supply, carries the surge still higher. At the top of the surge, when atmospheric pressure has replaced the vacuum in chamber 10, and the hydrostatic head 17 in the pump chamber 10 is enough above the level 22 of liquid in the local supply chamber 20 to open the dumping check valve 19 at the bottom of the latter, the liquid in the pump chamber then has two paths open for escape, one forward into the local supply chamber 20, which is continuously open to atmosphere, and one backward into the pipe 11 through which it came. Liquid in the local supply chamber is subject to withdrawal by outward suction through the pipe 23 to the carburetor, reducing the level in chamber 20 at whatever rate may be demanded by the operation of the engine; but the apparatus being described keeps the level at about 21—22. The surface of the liquid body in the pump chamber 10 stands somewhere in the narrow space around the tall float 12, whose body nearly fills horizontally the chamber 10. Therefore the very considerable drop of liquid head from 17 to 18 in the pump chamber corresponds to only a very slight change in elevation of the top of the liquid in the local supply chamber. The drawings indicate for that latter a range of only one-sixteenth inch, from 21 to 22; and computation indicates that in the apparatus illustrated it does more nearly approximate one thirty-second of an inch, the ratio of liquid areas being preferably one to twenty or more. In the pump chamber, when a buoyant rise of float 12 has ended the vacuum pull through 13, and has let in air through 14, liquid nevertheless continues to flow in by inertia and momentum of the long column moving upward through 11 from the low main reservoir (not shown), and this inertia builds up a hydrostatic head considerably above what would obtain if all were at rest, or if the inflow were to a chamber wherein the liquid had a substantial top area. When the down-flow begins, a feature of the invention comes into play, in that the dumping valve 19 throws open a discharge area much greater than the area of opening through which flow can occur back through the inlet duct, which is pipe 11. Figures 5, 6 and 7 illustrate the dumping discharge area as being approximately double the narrow area for liquid around the tall float 12, and twenty times the area open for back flow from that narrow area through pipe 11, and that ratio might be greater, for making the discharge from the pump chamber preferentially into the local supply chamber if the latter will take it—as it will in periods of large carburetor demand, and as it will not whenever the level in chamber 20 plus weight of valve 19 overbalances the hydrostatic head in the pump chamber.

The preferential character of flow into the local chamber is enhanced by another utilization which the invention makes of the inertia of the liquid fuel. This comes about through the very high frequency of pulsations which, in ordinary operating of an automobile, are of the order of one per second of time. In this range, which is from a half cycle per second to one and one-half cycles per second, the pulsations are at intervals whose variation is not more than one-half second from the above said one per second. The frequency of replenishment pulsations from pump chamber 10 to local supply chamber 20 which I have experienced in the installation above mentioned has ranged between thirty cycles per minute at idling and ninety cycles per minute at times of high demand. Such frequency makes the feeding practically continuous. The column of liquid flowing upward from the low tank through pipe 11 to the pump chamber 10 has such an upward momentum as will postpone the back-flow of this column after suction ceases in each cycle. When suction of the next cycle begins not much if any delay in resumption of column up-flow will be experienced.

When the dumping valve 19 is open it appears that the momentum of flow has some effect in prolonging its open period, while liquid in the pump chamber is falling toward the level indicated at 18. When the engine is not running, liquid will remain in the pump chamber, at the approximate level of the pipe 11 orifice, which is approximately at the level of liquid retained in the local supply chamber. Upon a falling of level in the latter sufficient to let the valve 19 open under the static head that is in the pump chamber, the very slight descent of the float 12 will close the atmospheric valve 14 and open the suction valve 13 to draw liquid up from the low rear tank, which will arrive in ample season because of the supply already contained in the bottom part of the pump chamber and the local chamber 20.

The remarkably high frequency of pulsations results from the extremely short travel of valve, coupled with the features above mentioned, and coupled with the impact character of the closing of these valves, each being an abrupt seating, illustrated in this particular instance as that of a cone.

The suction sufficient to operate this apparatus may be derived from the carburetor, if the carburetor be of the type illustrated in my said co-pending applications wherein a constancy of vacuum sufficient for the purpose is found in the mixing chamber under all conditions, not too low when the throttle is wide open at moderate speeds, and not too high so as to cause a sticking of the suction valve 13 when the throttle is closed, as in idling; and in such installations the entire apparatus is so small that it can be mounted directly on the side of the carburetor. But the utility of the invention is not limited to that particular type of carburetor; and if the particular type to which it is to be applied has at times an insufficiency of suction, this can successfully be amplified by a booster system, which may as herein illustrated comprise a Venturi tube built into the head part of the pump chamber, indicated at 33, from which the pipe passage 34 leads to the carburetor. Suction, and consequent rapid flow of air in direction of the arrow past the annular gap located at the narrows, entrains other air from the duct 9, as in an ejector. The booster 33, seen only fragmentarily in Figure 14 as a part of the two-stage booster there shown, is the same as that seen wholly in Figure 13, and is intermittently connected to the pump chamber as that is. Dimensions which I have found suitable for this in an installation of the size which is being discussed are a round passage narrowing from three-eighths inch to one-eighth inch and then expanding to one quarter inch, in a total distance of an inch or a little more, the gap annularly surrounding the passage at its narrowest part having a width of .015 inch, when a passage of one sixteenth inch from the pump chamber is sufficient; but the booster if needed can be otherwise designed according to principles already known. The particular dimensions given have the merit that they serve to produce a vacuum four and one-fourth times as great as the basal vacuum, so that if a carburetor to which the invention is applied has in its mixing chamber a vacuum of one inch of mercury, which nearly all carburetors now in use can be relied upon to produce, this will be magnified by the booster to about five inches of mercury at the pump chamber, as can be shown by a vacuum gage suitably attached, and so will be sufficient for the extreme cases requiring fuel to be lifted five feet or more from low rear tank to the carburetor's local supply. The whole apparatus is so small it can be secured on the side of the carburetor 35 by a screw 36. Its duct 33 may register with a duct 34 in the wall of carburetor 35, a fragment of which is at the left in Figure 7, leading to the partial vacuum in its mixing chamber (not shown). Similarly the outlet 24 may register with another passage (not shown) in the carburetor, to conduct to the needle valve fuel drawn through the vertical tube 23 from the bottom part of the local supply chamber 20.

It is important that the valves 13 and 14 should never stick or stop in mid-position. Helpful factors which contribute to the success of the invention in this respect are the frictional drag of the liquid on the sides of the cylindrical float as it surges through the narrow space surrounding the float; the high level to which it surges imparting to the float an extraordinary buoyancy force upward; and the low level to which it sinks, applying much of the weight of the float as a downward force; the abrupt abutment characteristic of the valve-seating, with consequent freedom from friction and danger of sticking; and the shortness of valve travel which enhances the measure of over-surge and the speed and frequency of cycles. Because of these features the springs, levers and snap action devices of prior art are eliminated, and the construction is simplified.

Although a float is shown in the instance illustrated, it will be observed that this is not the float of customary carburetor bowls and vacuum tanks as hitherto known. It does not float on the liquid whose level is to be maintained constant, nor float at the level which is to be maintained or restored. That level is maintained by small and limited increments offered with high frequency by the high hydrostatic head 17, the inflow into 20 being not stopped by the float, but being stopped by the integrated effect of hydrostatic head in chamber 20; weight of valve 19; friction there, if any; and kinetic force of inflow impinging on that valve—all of this being set against the head in the pump chamber, which head falls very quickly because of the small content of the space beside the float. I believe this to be the explanation of the fact observed, in my experience, that when the engine is operating the inflow to the local supply chamber is practically continuous and is so nearly equal to the continuous withdrawal rate of the carburetor that the level stands practically constant. But if at any time it were to fall, the increments would become larger, because of higher hydrostatic pressure from the level 17; and if it were to rise they would become smaller. The placing of the chamber 20 at the same level as the chamber 10 enables it to accommodate whatever quantity can flow in from 10. The high frequency of pulsations in chamber 10 enables that chamber to supply whatever is needed in chamber 20.

The float is a device to operate the air and vacuum valves synchronously with the surge between hydrostatic high head 17 and low head 18. As other means could be used for working the valves synchronously with rise and fall of the liquid, and other construction for restricting the area of the surging liquid, it will be recognized that in a broad sense the application of the invention is not limited to the using of a float to serve these functions.

In the embodiment of the invention illustrated in Figures 1–5 the pump tank 110 stands physically within the local supply tank 120, but the principles embodied and the operative action are similar. The vacuum suction 109 is indicated as being direct from the source of vacuum without a booster, for operating the pump; the intake of fuel from the low rear reservoir is through the pipe 111 at the top, there being a shield 111' to prevent the inflow stream from striking the float; and the dumping valve 119, from pump chamber to local supply chamber, stands under the former, held upward by spring 119' until the head of liquid in the pump chamber at atmospheric pressure opens it, the single valve having three ports to make a large dumping opening, shown at 119'' in Figure 5. The arrangements of Figures 1–5 compact the apparatus as a whole in the different shape thus shown.

Figures 10–14 illustrate the apparatus of Figure 6 applied with double action effect so that the suction duct 224 which leads to the needle valve of the carburetor is served by two vertical suction pipes 23, one in each of the two local supply chambers 220, for the replenishing of which a discharge occurs from one or the other of the two pump chambers 210 with double frequency, because each pump is discharging when the other is not discharging. These two are kept in step by a synchronizing lever 214 applied like a walking beam to the tops of the two air valves.

In this case the Venturi booster 33 is in series with another booster 233 and thus the boosting of the suction is compounded. Air sucked from the pump chamber primarily by a booster 33, which is intermittently connected to that chamber, goes secondarily through a booster 233 which is adapted to be continuously connected to a carburetor. The secondary booster may be larger than the primary, particularly if there is a second pump chamber, each with its primary separate booster, both being served by the same secondary booster 233 in series parallel connections, in which case the latter may have a capacity at least equal to the total draft for operating the two primary boosters.

The booster 233 may be omitted as seen in Figure 13; or both boosters may be omitted if the suction available is sufficient without them.

Also, in Figures 10–14, the casing for the atmospheric and pump chambers is separable into parts on a horizontal mid-plane through all three of the chambers; and the pumping valves are in the top section, and the discharge valves are in the bottom section. This permits of low expense by separate manufacture of the two ends of the group of chambers.

I claim as my invention:

1. In a vacuum operated device for feeding liquid to an atmospheric-chamber container, to maintain the level of liquid therein within a range of fluctuations so slight that the level thereof is approximately constant,—in which feeding device there is a supply duct rising from below for holding a drawn-up column of liquid; a pump-chamber supplied by the duct; and said atmospheric-chamber, fed from the pump-chamber by hydrostatic head and a discharge port having a non-return valve; the said pump-chamber having ports to vacuum and to atmosphere, with poppet valves and a float connected to and operating those valves the closing travel of each valve being opening travel of the other valve, and the rising and falling range of the float being limited by the closed positions of those poppets, the atmospheric-chamber and the pump-chamber having chamber space at the same level;—that combination in which the duct is continuously free from obstruction that would prevent flow of liquid through it to the pump-chamber; and the pump-chamber has space higher than the said constant level of liquid in the atmospheric-chamber, being space not filled by the float but being open for liquid to rise above the level of that top of liquid which exists in the pump-chamber at the time of closure of the vacuum port, the cross-sectional area of said space being so small relative to the volume of liquid inflow, which then continues by momentum of the liquid column, that the said continuing inflow raises the liquid level in the pump-chamber to a substantial height above its said level at closure of the vacuum port, and above the said constant level in the atmospheric-chamber.

2. Means for maintaining a supply of liquid at a level whose range of fluctuation is so slight that the level is approximately constant, comprising an atmospheric-chamber in which the said constant level is to be maintained, combined with means to replenish outgo from said chamber comprising a pump chamber having space that is level with space in the atmospheric-chamber; said pump-chamber having a supply duct rising from a lower level, constantly open for flow of liquid from the duct into the pump-chamber, and having a port with a non-return valve for discharge from the pump-chamber into the atmospheric chamber; valve means for the pump chamber, providing therein alternate short periods of exposure to atmosphere for the said discharge, and to vacuum for indraft of liquid; and means to operate those valves and to synchronize the atmospheric periods with higher and falling levels of liquid in the pump chamber, and to synchronize the vacuum periods with lower and rising levels of liquid therein; the said structure being distinguished by having the conformation of pump-chamber walls and permanent contents, providing space for liquid, arranged for enlarging greatly the range of rise and fall of liquid therein, relative to the range of rise and fall which an equal volume of liquid would have in the atmospheric chamber, and for promoting high frequency of the said periods; the said conformation, for receiving the upper part of that volume of liquid which may normally be contained in the pump chamber in each period, having a shape which is extended vertically and diminished horizontally, as compared respectively with the vertical and horizontal extents which that equal volume of liquid would occupy if it were introduced into the atmospheric-chamber and lay as a layer therein at the said constant level.

3. In a pumping chamber operated by vacuum for lifting liquid by high frequency impulses, having float-controlled vacuum and atmospheric valves, the combination, with the chamber, of said float nearly filling that chamber's area of horizontal cross section, leaving only small area for liquid around that float within the chamber; said chamber and float having walls which, with said smallness of area intervening, extend vertically throughout the range of fluctuation of the top of the liquid in the chamber; said chamber having an intake port; and, at a level below said fluctuation, having a valved discharge port whose area of opening is at least as large as the said small area for liquid around the float, whereby the discharge of a relatively small volume of liquid is attended by a relatively large drop of said top of liquid, providing for high frequency of reversal of the float-control.

4. Pumping means for constantly replenishing to a predetermined level, liquid in an atmospheric chamber, from a pump chamber at the same level having a one-way gravity discharge valve thereto; said means comprising the combination of the pump chamber with a supply duct rising from below and being constantly open at a level in the pump-chamber below the top level of liquid therein, and mechanism providing therein immediately consecutive periods of suction alternately with periods of atmospheric pressure, for raising liquid therein to above said predetermined level and letting liquid thence back into the duct, whereby the raised liquid immediately falls.

5. Means for replenishing liquid outgo from an atmospheric chamber as in claim 4 in which the walls of the atmospheric chamber surround the side and bottom walls of the pump chamber; the said discharge valve being at the bottom of the two chambers.

6. Means for replenishing liquid outgo from an atmospheric chamber as in claim 4, in which the ratio of area exposed for rise and fall of liquid in the pump chamber to area of constant level of liquid in the atmospheric chamber, is a very small ratio.

7. Means for maintaining a supply of liquid at constant level as in claim 2, in which a single integral casing contains the two said chambers standing side by side, the lower part of the pump chamber extending under the atmospheric chamber, and the said discharge valve having there a horizontal seat in the bottom of the atmospheric chamber.

8. Means for maintaining a constant level of liquid, comprising an atmospheric chamber in which the said constant level is to be maintained, combined with means to replenish outgo from said chamber comprising two pump chambers level with the atmospheric chamber and arranged with the atmospheric chamber between them; each said pump chamber having constantly open means for flow from and to a lower level, and there being a one-way discharge valve from each pump chamber into the atmospheric chamber; there being valve means providing in each pump chamber alternate pulsations of vacuum and of atmosphere; the top portions of the three chamber walls being a unit together, above a horizontal midplane through all three chambers, and the bottom portions of the same three chamber walls being a unit together below said plane; these two units being secured together at said plane.

9. A liquid-feeder combination as in claim 1, in which the area of said top level of liquid in the pump chamber is only a small fraction of the cross-sectional area of the pump chamber throughout the range of travel of the float therein, whereby the change of height of said top level of liquid following an arresting of the float is large and fast relative to its change coincident with float travel.

10. A liquid-feeder combination as in claim 1, in which said atmospheric chamber is at the level of the pump chamber and has an area for liquid at the height of the constant level therein which is a multiplicity of times greater than the area of liquid at said top level in the pump chamber, whereby the hydrostatic head of surge in the pump chamber corresponds to only a trifling rise of liquid level in the atmospheric chamber.

11. A liquid-feeder combination as in claim 1, in which said atmospheric chamber is at the level of the pump chamber and has an area for liquid at the height of the constant level therein which is of the order of about twenty times greater than the area of liquid at said top level in the pump chamber.

12. A liquid-feeder combination as in claim 1, in which there is a one-way valved port between said pump chamber and atmospheric chamber delivering liquid by gravity from the pump chamber to the atmospheric chamber; and there is a continuously open liquid-intake port for the pump chamber having an area which bears a ratio to the area of said valved port of the order of about one to twenty or more.

13. A liquid-feeder combination as in claim 1, in which the float travel between valve closings is so short, the approach of the float area to area of the pump chamber is so close, the buoyancy of the float and the inertia of the float such, that the frequency of pulsation cycles is at intervals whose variation is not more than one-half second from single second intervals.

14. A liquid-feeder combination as in claim 1, in which each said poppet valve, having travel to a distance sufficient to set it fully open, which travel is limited by the seating of the other poppet valve, has its travel of the order of one-sixteenth of an inch.

15. A liquid-feeder combination as in claim 1, in which the air and vacuum valves and ports are in the head of the pump chamber; and a wire along which the float is slidable is fixed vertically in the pump chamber; and there is a plate carried by the float and carrying the air and vacuum valves and having a guide stem engaging in said chamber head.

16. A liquid-feeder combination as in claim 1, in which the said atmospheric chamber is at the level of the pump chamber, and there is a liquid-intake port for the pump chamber at a level approximately the same as the level, which is maintained constant, of liquid in the atmospheric chamber.

17. In apparatus of the class described, having an atmospheric-chamber container in which an approximately constant level of liquid is to be maintained; a pump-chamber for feeding it by hydrostatic head through a non-return valve, these two chambers having space at the same level; a duct rising from below for supplying liquid to the pump-chamber; the said pump-chamber having ports with poppet valves to vacuum and to atmosphere, and a float to operate these port valves oppositely; the combination being distinguished in that the structure provides space which is open to permit downflow and upflow of liquid, in the duct and the pump-chamber, beyond the levels which the liquid has respectively at closure of the atmosphere valve and at closure of the vacuum valve.

18. In apparatus of the class described, having an atmospheric-chamber container in which an approximately constant level of liquid is to be maintained; a pump-chamber for feeding it by hydrostatic head through a non-return valve, these two chambers having space at the same level; a duct rising from below for supplying liquid to the pump-chamber; the said pump-chamber having ports with poppet valves to vacuum and to atmosphere, and having means controlled by the level of liquid in the pump-chamber to operate these port valves oppositely; the combination being distinguished by this that the structure is free from obstruction to outflow of liquid from the pump-chamber back through the duct immediately upon completion of each period of inflow.

19. In a pumping chamber for lifting liquid by high frequency impulses, having vacuum and atmospheric poppet valves, an intake port for liquid, and a float controlling said valves, limited in travel by the opposite seating of those valves—that combination in which the float nearly fills that chamber's area of horizontal cross-section, leaving only small area for liquid around that float within the chamber; said chamber and float having walls which, with said smallness of area intervening, extend vertically throughout the range of fluctuation of the top of liquid in the chamber; said chamber, at a level below said fluctuation, having a gravity discharge port with valve openable by hydrostatic head whose cross-sectional area so greatly exceeds the said area for liquid around the float that the outrush of liquid accompanying a momentary opening of this discharge valve lowers the level of liquid in said small area around the float to an extent exceeding that to which fall of the float is limited by its seating the said poppet valves.

20. A feeding unit comprising a cylindrical pumping chamber operated by vacuum for lifting liquid by high frequency impulses, and having ample intake and discharge ports, and a cylindrical chamber eccentrically housing the pumping chamber, the second chamber receiving the dumpings of the pumping chamber and being open to atmosphere, there being a suction pipe for removal of the dumpings from the second chamber in the space of greatest breadth made by the eccentricity of the two cylinders.

ROLLIN ABELL.